United States Patent [19]

Suzuki et al.

[11] Patent Number: 4,571,653
[45] Date of Patent: Feb. 18, 1986

[54] PERPENDICULAR MAGNETIC RECORDING HEAD

[75] Inventors: Toshiyuki Suzuki; Masanori Isshiki, both of Yokohama, Japan

[73] Assignee: Tokyo Shibaura Denki Kabushiki Kaisha, Kawasaki, Japan

[21] Appl. No.: 421,738

[22] Filed: Sep. 23, 1982

[30] Foreign Application Priority Data

Oct. 8, 1981 [JP] Japan ................. 56-159476

[51] Int. Cl.$^4$ .................... G11B 5/12; G11B 5/27; G11B 5/28; G11B 5/25
[52] U.S. Cl. .................................. 360/125; 360/119; 360/121
[58] Field of Search ............... 360/125, 121, 122, 123, 360/119, 110, 113, 66, 126, 127, 128; 29/603

[56] References Cited

U.S. PATENT DOCUMENTS

| | | | |
|---|---|---|---|
| 3,875,545 | 4/1975 | Curtiss | 360/125 |
| 4,115,827 | 9/1978 | Gooch | 360/121 |
| 4,287,540 | 9/1981 | Cheatham | 360/119 |
| 4,316,228 | 2/1982 | Fujiwara | 360/127 |
| 4,383,284 | 5/1983 | Isshiki | 360/125 |
| 4,413,297 | 11/1983 | Tanaka | 360/119 |

FOREIGN PATENT DOCUMENTS 56-87217  7/1981  Japan .
56-87219  7/1981  Japan .
56-87220  7/1981  Japan .

Primary Examiner—Robert M. Kilgore
Attorney, Agent, or Firm—Oblon, Fisher, Spivak, McClelland & Maier

[57] ABSTRACT

A perpendicular magnetic recording head comprising a pole formed of a highly permeable magnetic thin film facing at the end thereof the magnetic surface of a recording medium, a side member formed of a highly permeable magnetic material joined with the film surface of the pole, a nonmagnetic holder for holding the pole and the side member from the side surfaces, the nonmagnetic holder having coil hole, and an exciter coil wound around the pole and the side member through the coil hole, characterized in that the coil hole is gradually increasing in width from the end of the side member toward the rear.

4 Claims, 5 Drawing Figures

PERPENDICULAR MAGNETIC RECORDING HEAD

BACKGROUND OF THE INVENTION

The present invention relates to a perpendicular magnetic recording head for recording a high density signal by forming magnetization perpendicular to the plane of a magnetic recording medium.

A perpendicular magnetic recording for recording high density signals by forming magnetization perpendicular to the plane of a magnetic recording medium is known. A magnetic head used in this kind of recording was disclosed, for example, in Japanese Patent Disclosure Nos. 56-87217, 56-87219 and 56-87220. The magnetic head includes a magnetic pole formed of a highly permeable thin magnetic film the end of which faces the magnetic surface of a recording medium, a side member formed of a highly permeable magnetic material which is jointed with the film surface of the pole, an exciter coil wound around the pole via the side member, and a nonmagnetic holder for holding the pole and the side member. It is, however, very difficult in a magnetic head of this type to reduce the size of the components so as to increase recording efficiency. Particularly, it has been desired to provide a magnetic head which has high durability and reliability for practical use in a perpendicular magnetic recording system.

SUMMARY OF THE INVENTION

It is an object of the present invention to provide a perpendicular magnetic recording head which permits perpendicular magnetic recording of a signal with high efficiency.

In order to achieve the above object, there is provided according to the present invention a perpendicular magnetic recording head which comprises a pole formed of a highly permeable magnetic thin film the end of which faces the magnetic surface of a recording medium, a side member formed of a highly permeable magnetic material joined with the film surface of the pole, a nonmagnetic holder for holding the pole and the side member and having a coil hole which is gradually increased in width from the end of the side member toward the rear, and an exciting coil wound around the pole via the side member through the coil hole.

The perpendicular magnetic recording head thus constructed permits high recording efficiency as well as the improvements in the durability and the reliability of the pole formed of a magnetic thin film. Further, this perpendicular magnetic recording head can also sufficiently allow for the superior characteristics of the side member which is joined with the film surface of the pole. As a consequence, the perpendicular magnetic recording head according to the present invention is constructed simply and still provides high utility.

BRIEF DESCRIPTION OF THE DRAWINGS

Other objects and advantages will become apparent from the following description taken in conjuction with the accompanying drawings in which.

DETAILED DESCRIPTION OF THE PREFERRED EMBODIMENTS

Figure 1:
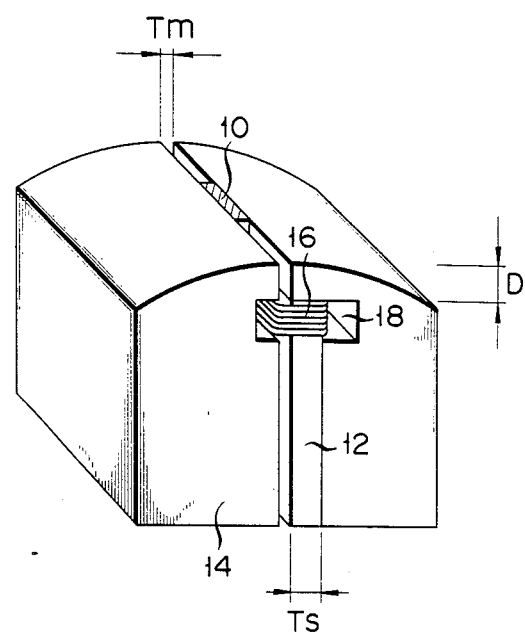
FIG. 1 is a perspective view of a prior art perpendicular magnetic recording head.
Figure 2:
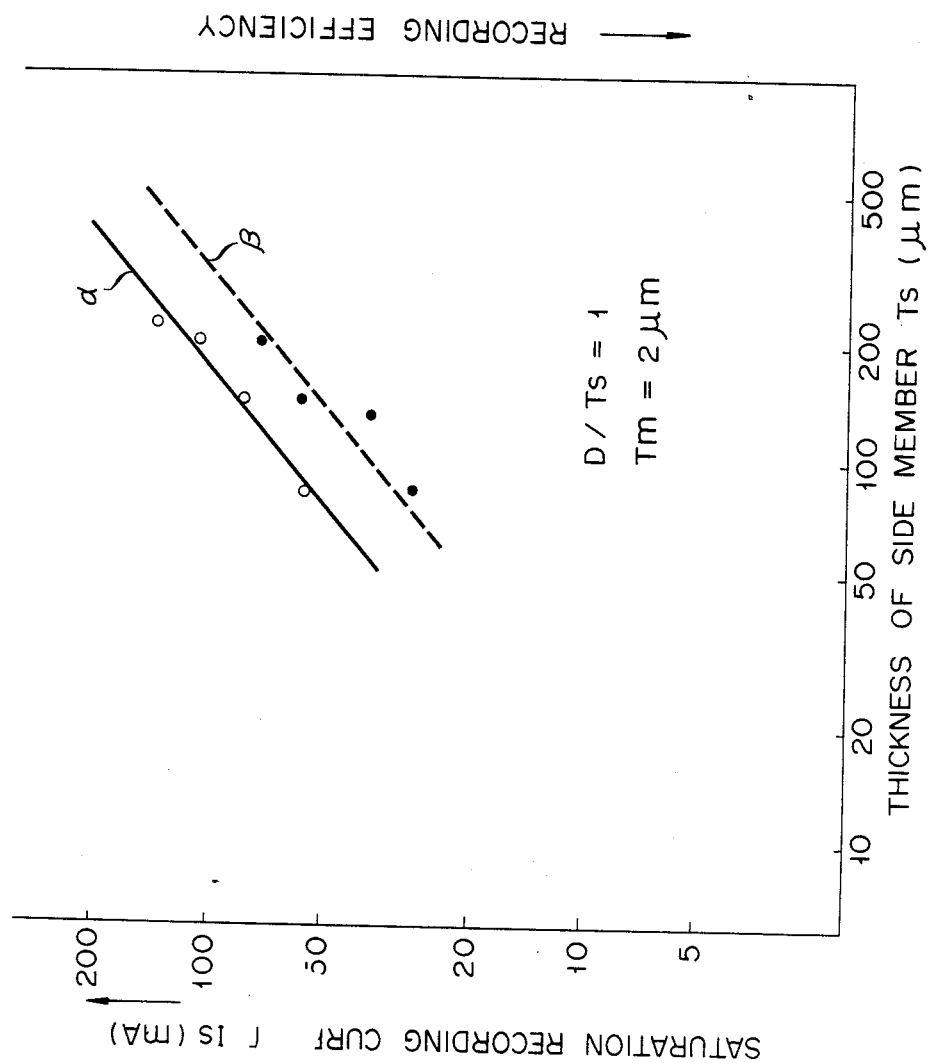
FIG. 2 is a diagram showing the characteristics of the saturation recording current $I_S$ with respect to the thickness $T_S$ of a side member of the perpendicular magnetic recording head.

A prior art magnetic head shown in FIG. 1 includes a pole 10 formed of a highly permeable magnetic thin film, a side member 12, a nonmagnetic holder 14 for holding the pole 10 and the side member 12, and an exciter coil 16 wound around the pole 10 via the side member 12. The end of the pole 10 faces the magnetic surface of a recording medium. A magnetic head of this type is called "a main-pole-driven magnetic recording head". According to the present inventors' experiments, it was discovered that, when the thickness $T_S$ of the side member is reduced and the protrusion length D of the pole is shortened proportionally to the thickness $T_S$ of the side member, a recording current $I_S$ necessary for saturation recording of a perpendicular recording medium will decrease, thereby improving the recording efficiency. This result is shown in FIG. 2. In FIG. 2, curves $\alpha$ and $\beta$ represent the results of the saturation recording currents obtained by using different recording media. In this case, the ratio $D/T_S$ of the protrusion length D of the pole to the thickness $T_S$ of the side member is set to unity, and the thickness Tm of the pole is set to 2 $\mu$m.

In the thus far proposed magnetic head, a coil hole 18 is formed in a rectangular shape, and the upper surface of the nonmagnetic holder 14 for holding the pole 10 and the side member 12 is formed in a curved surface. When reducing the protrusion length D and the thickness $T_S$ of the side member while maintaining the ratio $D/T_S$ to be constant, there exists a predetermined limit due to the restriction in the position of the coil hole.

Figure 3:
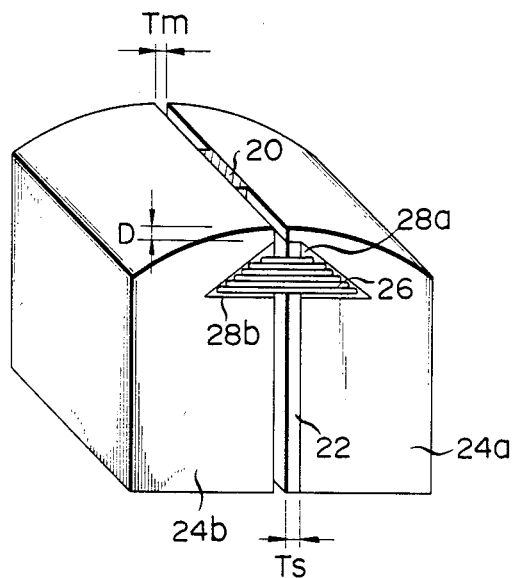
FIG. 3 is a perspective view of a perpendicular magnetic recording head according to the present invention.

The present invention has been performed on the basis that the recording efficiency of a perpendicular magnetic recording head can be improved by reducing the thickness $T_S$ of the side member and the protrusion length D of the pole from the side member. An embodiment of the present invention will now be described in more detail with reference to FIGS. 3 and 4. The magnetic head according to the present invention comprises a pole 20 formed of a high permeability magnetic thin film, a side member 22 intimately formed with the side surface of the pole 20, a pair of nonmagnetic holders 24a, 24b, and an exciting coil 26 wound around the pole 20 and the side member 22. The pole 20 is formed, for example, of permalloy or amorphous alloy. The side member 22 is formed, for example, of Mn—Zn ferrite, and is in intimate contact with the side surface of the pole 20. The side member 22 is formed, for example, to be buried in a first nonmagnetic holder 24a which is formed of glass or ceramic. The surfaces of the side member 22 and nonmagnetic holder 24a are formed in the same plane. The pole 20 is intimately formed by a deposition in a predetermined width on the side surface of the side member 22. The second nonmagnetic holder 24b is secured with an adhesive to the forming surface of the pole 20.

Coil holes 28a, 28b formed in a triangular shape as seen from the front side are respectively formed at the ends of the nonmagnetic holders 24a, 24b. The coil holes 28a, 28b are respectively gradually increased in the width from the ends toward the rear. The upper ends 30a, 30b of the coil holes are respectively formed of a rectilinear line or curve similar to the rectilinear line forming an angle $\theta$ with respect to the horizontal line. A wire material 32 for the coil is wound around the pole 20 and the side member 22, thereby forming the coil 26 for exciting the pole 20. This coil 26 is disposed within the triangular-shaped coil holes 28a, 28b. The end of the pole 20 serves as a recording head surface, and the ends of the nonmagnetic holders 24a, 24b polished in a circular-arc shape serve as the sliding surface of a recording medium 34.

In the perpendicular magnetic recording head thus constructed according to the present invention, the upper ends 30a, 30b of the respective coil holes 28a, 28b are so formed as to produce an angle $\theta$ with respect to the horizontal line. Therefore, the ends of the nonmagnetic holders 24a, 24b are polished in a circular-arc shape without being limited to the positions of the coil holes 28a, 28b. In this manner, the thickness $T_S$ of the side member 22 and the protrusion length D of the pole 20 from the side member 22 can be advantageously reduced. As a consequence, the recording sensitivity of the perpendicular magnetic recording head of the present invention can be remarkably improved. Further, the pole 20 is in intimate contact with the side surfaces of the side member 22 and the first nonmagnetic holder 24a and the second nonmagnetic holder 24b are lapped on the pole 20 to be rigidly held. Therefore, the pole 20 can be made mechanically very stable though it is formed in thin film. The end of the pole 20 is further rigidly held with the ends of the first and second nonmagnetic holders 24a, 24b. Therefore, the pole 20 is stabilized against the external force produced upon moving of the recording medium 34. When the first nonmagnetic holder 24a in intimate contact with the pole 20 is disposed at the downstream side with respect to the moving direction of the recording medium, the downstream-side edge of the pole end which directly relates to the perpendicular magnetic recording becomes very sharp. In this manner, this magnetic recording head can perform perpendicular magnetic recording of high resolution. According to the present invention, there is thus provided a perpendicular magnetic recording head having extremely high recording efficiency, excellent durability and high reliability.

Figure 5:
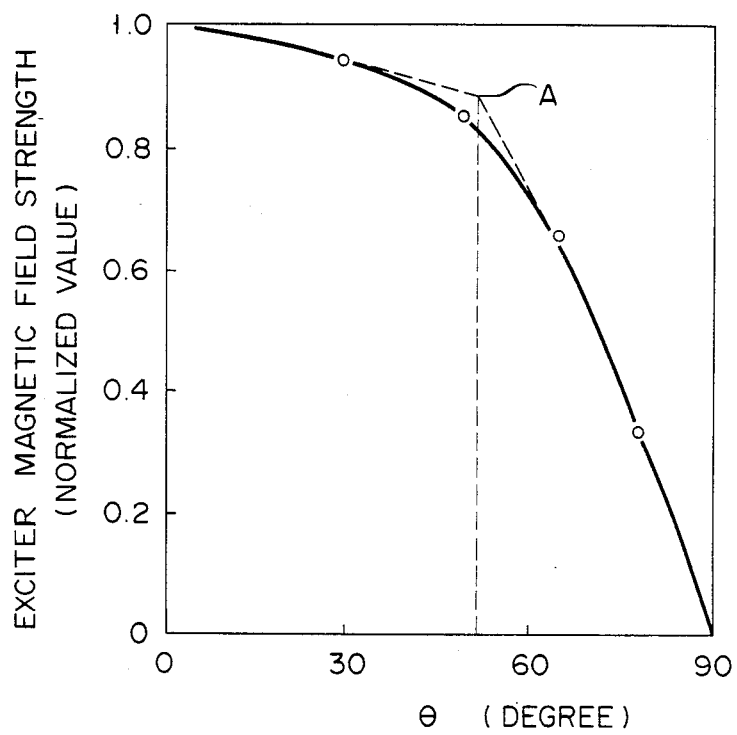
FIG. 5. is a diagram showing the relationship between an angle $\theta$ formed between a coil hole and a horizontal surface and an exciting magnetic field strength.

FIG. 5 shows variations in the exciter magnetic field strength with respect to the angle $\theta$ formed between the coil holes 28a, 28b and the horizontal line (the moving direction of the recording medium). The exciting coil 26 is filled in the coil holes 28a, 28b. The exciter magnetic field strength is the mean exciter magnetic field strength of the side member 22 from the upper end of the side member 22 to the position of 100 $\mu$m from the upper end of the side member 22 which mainly contributes to the magnetization at the end of the pole 20. The curve of the exciter magnetic field strength varies relatively slowly up to $\theta = 50°$ (at the point A in FIG. 5). This curve of the exciter magnetic field strength abruptly decreases when the $\theta$ exceeds 50°. When the suitable value of the $\theta$ is thus selected to be less than 50° and the reducing step described above is taken, in which the side member 22 is reduced in thickness and the protrusion length of the pole is shortened, then the total recording efficiency of the perpendicular magnetic recording head of the present invention can be remarkably improved, overcoming the reduced efficiency due to the increase in the exciter magnetic field strength.

Figure 4:
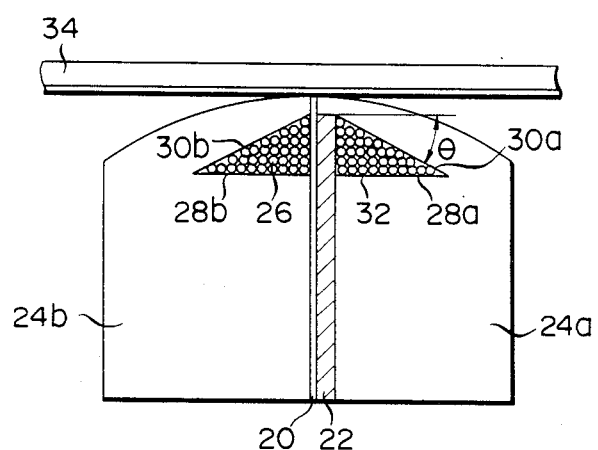
FIG. 4 is a front view of a perpendicular magnetic recording head of the present invention.

In comparison, in the prior art magnetic head of this type, the thickness $T_S$ of the side member 22 was formed to approx. 100 $\mu$m. However, according to the present invention, the thickness $T_S$ of the side member 22 can be formed to 10 $\mu$m, and the protrusion length D of the pole 20 can be reduced to 10 $\mu$m. Therefore, as shown in FIG. 2, the saturation recording current can be reduced to 1/10 as compared with the thus far proposed magnetic head. Accordingly, the recording efficiency can be improved by 20 dB. On the other hand, the decrease in the efficiency due to the inclination of the coil holes 30a, 30b is more or less $-1.4$ dB in the range of $0 < \theta < 50°$ as shown in FIG. 4. Therefore, the total recording efficiency can be improved by 18.6 dB.

On the other hand, when the coil hole shape is formed in the same manner as the prior art magnetic head, the protrusion length of the pole can be reduced merely to 70 to 80 $\mu$m. In order to stably move the head in intimate contact with the tape, the curvature of the upper surfaces of the nonmagnetic holders 24a, 24b should be limited to less than a predetermined value. As a result, the recording efficiency of the thus far proposed magnetic head can be improved more or less 2 to 3 dB.

From the foregoing description, further important advantages and features of the present invention can be provided as below. Since the required number of turns of exciting coil can be reduced due to the improvement in the efficiency allowed by the above-described reduction, the coil hole can be narrowed. This narrow coil hole further permits reduction in pole size.

The present invention is not limited to the particular embodiments described above. For example, the upper ends of the coil holes 28a, 28b may be a curved line bent suitably in a range so as to not lose the recording efficiency. The shape of the coil hole may also be any shape in addition to the triangular shape described above. For example, the coil hole may be a rhombic shape. The angle $\theta$ formed between the upper end surfaces 30a, 30b of the coil hole and the horizontal plane may be larger than an angle formed between the upper end surface of the nonmagnetic holder and the horizontal plane.

Furthermore, the side members 22 may be respectively provided at both side surfaces of the pole 20. In other words, the width, the thickness and the material of the pole 20 may be determined in response to the specifications. The present invention may also be applied similarly to the magnetic head of a mainpole-driven magnetic recording head which includes an auxiliary pole. In summary, various other changes and modifications may be made within the spirit and scope of the present invention.

What is claimed is:

1. A perpendicular magnetic recording head comprising:
   a pole formed of a highly permeable magnetic thin film having one end thereof facing the magnetic surface of a recording medium;
   a side member formed of a highly permeable magnetic material jointed with one film surface of said pole, said pole protruding by a predetermined length from one end of said side member;
   a nonmagnetic holder means in contact with a surface of said thin film and in contact with a surface of said side member for holding said pole and said side member, an upper surface of said nonmagnetic holder means formed in a curved surface with the top portion of said curved surface being level with said one end of said pole;

a coil hole formed in said nonmagnetic holder means on both sides of said jointed side member and pole, said hole gradually increases in width from said one end of said side member toward the other end of said side member in order to allow said predetermined length of said pole to be made substantially small and to maintain the mechanical strength of said nonmagnetic holder means, wherein the upper end surface of said coil hole formed by said gradually increasing width has an angle smaller than 50° with respect to a horizontal surface of said one end of said member; and an exciter coil wound around said pole and said side member through said coil hole.

2. The perpendicular magnetic recording head according to claim 1, wherein said coil hole is formed in substantially a triangular shape.

3. The perpendicular magnetic recording head according to claim 1, wherein said coil hole is formed in substantially a rhombic shape.

4. The perpendicular magnetic recording head according to claim 1, wherein an angle formed between the upper end surface of said coil hole and the horizontal surface is larger than an angle formed between the upper end surface of said nonmagnetic holder and the horizontal surface.

* * * * *